United States Patent
Habib et al.

(10) Patent No.: US 9,540,918 B1
(45) Date of Patent: Jan. 10, 2017

(54) SOLAR POWER AND ION TRANSPORT-BASED ENHANCED OIL RECOVERY SYSTEM AND METHOD

(71) Applicant: KING FAHD UNIVERSITY OF PETROLEUM AND MINERALS, Dhahran (SA)

(72) Inventors: Mohamed Abdel-Aziz Mostafa Habib, Dhahran (SA); Esmail Mohamed Ali Mokheimer, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/842,586

(22) Filed: Sep. 1, 2015

(51) Int. Cl.
*E21B 43/24* (2006.01)
*E21B 43/243* (2006.01)
*F24J 2/42* (2006.01)
*F24J 2/04* (2006.01)

(52) U.S. Cl.
CPC .............. *E21B 43/243* (2013.01); *F24J 2/04* (2013.01); *F24J 2/42* (2013.01)

(58) Field of Classification Search
CPC ...... E21B 43/24; E21B 43/2401; E21B 36/04; E21B 41/0085; E21B 43/243
See application file for complete search history.

(56) References Cited

U.S. PATENT DOCUMENTS

| | | | |
|---|---|---|---|
| 6,910,335 B2 | 6/2005 | Viteri et al. | |
| 7,468,173 B2 * | 12/2008 | Hughes | C01B 5/00 423/351 |
| 8,701,773 B2 | 4/2014 | O'Donnell et al. | |
| 8,734,545 B2 | 5/2014 | Hershkowitz et al. | |
| 2007/0221208 A1 * | 9/2007 | Goldman | F03G 6/005 126/651 |
| 2013/0240369 A1 * | 9/2013 | McAlister | C25B 11/03 205/343 |

FOREIGN PATENT DOCUMENTS

EP    2 096 257 A1    9/2009

OTHER PUBLICATIONS

Ravanchi et al., "*Application of Membrane Separation Processes in Petrochemical Industry: A Review*," Desalination, 2009, vol. 235, pp. 199-244.

* cited by examiner

*Primary Examiner* — Catherine Loikith
(74) *Attorney, Agent, or Firm* — Richard C. Litman

(57) ABSTRACT

The enhanced oil recovery (EOR) system includes a solar tower that heats air, which is fed to an ion transport membrane (ITM) unit. The ITM unit separates oxygen from the preheated air. The separated oxygen is injected into the oil well to burn part of the well's oil, thereby generating the heat required for thermally enhance oil recovery. Combustion of part of the well's oil reduces the viscosity of the remainder, enhancing extraction of oil from the well.

15 Claims, 1 Drawing Sheet

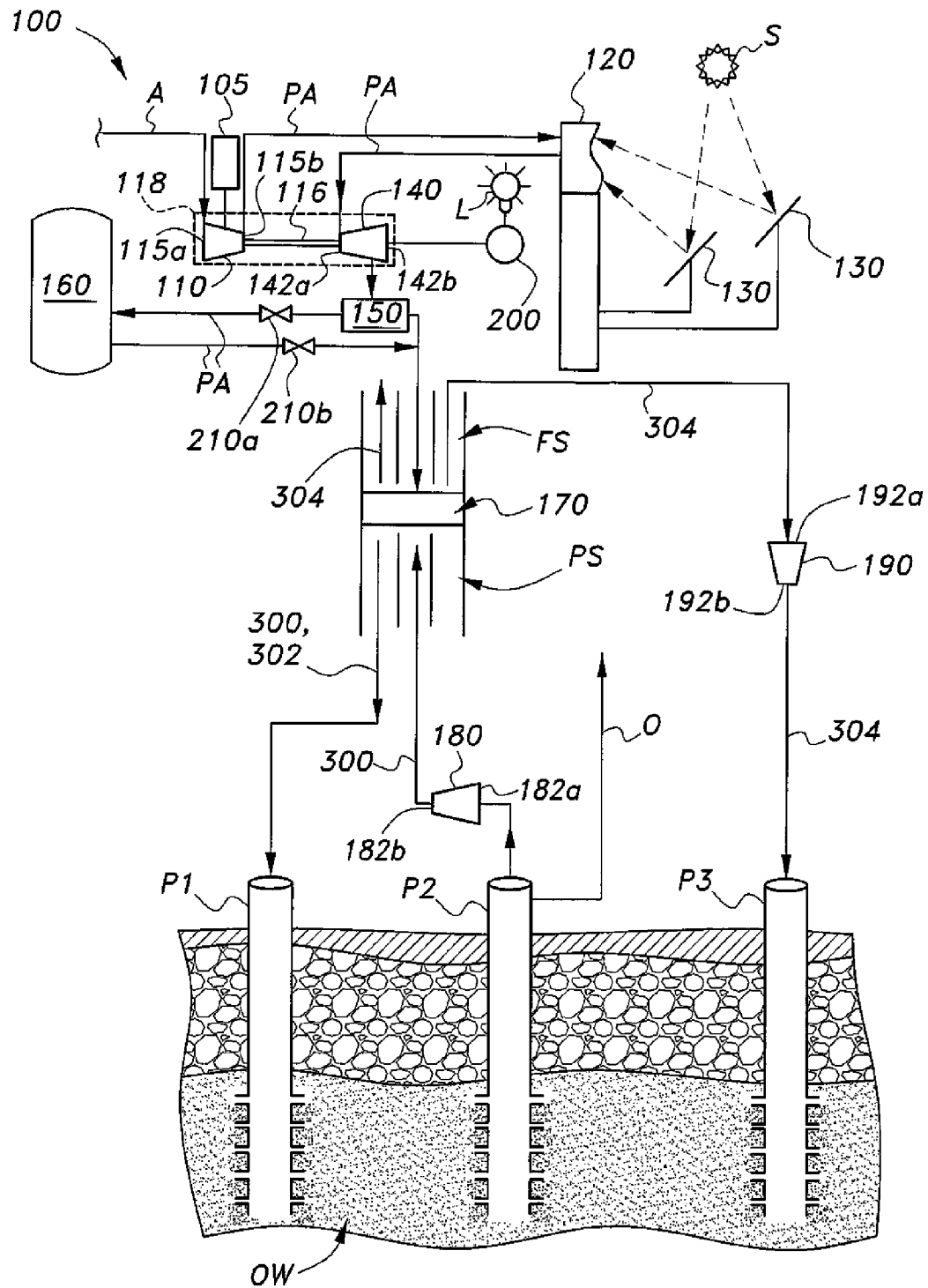

SOLAR POWER AND ION TRANSPORT-BASED ENHANCED OIL RECOVERY SYSTEM AND METHOD

BACKGROUND OF THE INVENTION

1. Field of the Invention

The present invention relates to oil recovery technology, and, more specifically, to an enhanced oil recovery system that includes a solar-assisted ion transport membrane to produce oxygen for combustion in the well for thermally enhanced oil recovery.

2. Description of the Related Art

Traditional methods of primary and secondary oil production generally recover about one-third of the oil in the reservoir while leaving the rest behind, since the cost to extract the remaining oil would likely be greater when compared to the cost to extract oil from a newly discovered oil field. Regardless, to maintain a high rate of oil recovery, many oil producers have started utilizing enhanced oil recovery (EOR) techniques to extract heavy oil from aged reservoirs.

Typically, EOR techniques utilize different methods, such as thermal recovery or injection of gas, chemicals, or brine water. Thermal injection represents the largest EOR implemented technology and accounts for approximately 51.5% of the EOR techniques currently on the market. Gas EOR technology and chemical EOR technology are expected to increase to 38.5% and 10.3%, respectively, of the EOR technology market by 2023.

However, although in situ combustion and down-hole heating have great potential as new thermal EOR technologies emerge, many current in situ combustion and down-hole heating thermal EOR technologies require the use of large amounts of natural fuel, such as natural gas. As such, due to their associated carbon dioxide emissions, thermal EOR technologies typically leave a significant environmental footprint. Moreover, as a result of the quantity of natural gas consumed, utilizing the current in situ combustion down-hole techniques is not only very expensive, but can also be an inefficient use of a region's natural gas reserves.

Thus, an enhanced oil recovery system solving the aforementioned problems is desired.

SUMMARY OF THE INVENTION

The enhanced oil recovery (EOR) system includes a solar tower that heats air, which is fed to an ion transport membrane (ITM) unit. The ITM unit separates oxygen from the preheated air. The separated oxygen is injected into the oil well to burn part of the well's oil, thereby generating the heat required for thermally enhance oil recovery. Combustion of part of the well's oil reduces the viscosity of the remainder, enhancing extraction of oil from the well.

These and other features of the present invention will become readily apparent upon further review of the following specification and drawings.

BRIEF DESCRIPTION OF THE DRAWINGS

The sole drawing FIGURE is a schematic diagram of an enhanced oil recovery system, according to the present invention.

DETAILED DESCRIPTION OF THE PREFERRED EMBODIMENTS

As shown in the sole drawing, the enhanced oil recovery system 100 includes a compressor section 118, having a first compressor unit 110, which includes an air intake portion 115a and a pressurized air PA discharge portion 115b. The compressor section 118 also includes a gas turbine 140 having a turbine intake portion 142a and a turbine discharge portion 142b. The gas turbine 140 is coupled to the first compressor unit 110 by a shaft 116. The system also includes a solar tower 120, which is positioned in communicating relation to the first compressor unit 110, including the pressurized air PA discharge portion 115b and the turbine intake portion 142a, and in communicating relation to an ion transport membrane (ITM) unit 170, so that atmospheric air A can be converted into pressurized air PA by the first compressor unit 110 and can subsequently be heated in the solar tower 120. The hot pressurized air PA can then be injected into the ITM unit 170, where oxygen 302 can be separated from the pressurized air PA. The oxygen 302 can then be injected into an oil well OW so that the oxygen 302 can be burned along with methane gas in the oil well OW to generate sufficient heat to enhance oil recovery, such as by decreasing the viscosity of oil.

The system 100 can include a power source 105 positioned in communicating relation with the gas turbine 140, the power source 105 being configured for operating the gas turbine 140. The system 100 also has a splitter 150 and a storage tank 160 positioned in communicating relation with the splitter 150. A generator 200 (such as an electric generator) is positioned in communicating relation with the gas turbine 140. A second compressor unit 180 having a carbon dioxide intake portion 182a and a carbon dioxide discharge portion 182b and a third compressor unit 190 having a nitrogen intake portion 192a and a nitrogen discharge portion 192b are disposed between the ITM unit 170 and the oil well OW. The power source 105 can also be configured for operating the second compressor unit 180 and/or the third compressor unit 190. Further, the system 100 can include a plurality of pipes, such as a first pipe P1, a second pipe P2, and a third pipe P3. A plurality of check valves, such as a first check valve 210a and a second check valve 210b, are configured for allowing the pressurized air PA to be injected into the storage tank 160, and for allowing the pressurized air PA from the storage tank 160 to enter the ITM unit 170, respectively.

The first compressor unit 110 can be any suitable type of compressor unit known in the art that can compress atmospheric air A to form the pressurized air PA. The gas turbine 140 can rotate the shaft 116, causing the first compressor unit 110 to operate. The gas turbine 140 can also power the generator 200 to generate sufficient electricity to power at least one auxiliary accessory, such as a light L, utilized in the extraction of oil. It is to be noted that as the first compressor unit 110 operates, it can inject the pressurized air PA into the solar tower 120, such as through the pressurized air PA discharge portion 115b of the first compression unit 110. The pressurized air PA can then be heated in the solar tower 120.

The solar tower 120 can be any suitable type of solar tower known in the art that can generate sufficient heat to heat the pressurized air PA from the first compressor unit 110 to an appropriate temperature, such as approximately 1200° C. It is to be noted that the solar tower 120 can have at least one solar collector 130 coupled to the solar tower 120, the solar collector 130 being configured to convert solar energy from the sun S into heat and/or electricity. The at least one solar collector 130 can be any suitable type of solar collector 130, such as a solar panel, known in the art and can have any suitable size. Once the pressurized air PA is heated in the solar tower 120 to the appropriate temperature, the pressurized air PA can be drawn into the gas turbine 140, after which the hot pressurized air PA can be injected into the ITM unit 170.

Prior to reaching the ITM unit 170, the pressurized air PA can enter the splitter 150 where the hot pressurized air PA can be diverted through the first check valve 210a into the storage tank 160, which is configured for storing hot pressurized air PA for use during periods of low solar radiation, such as night time or during a cloudy day. For example, during periods of high solar radiation, the first check valve 210a can be opened and the second check valve 210b can be closed to allow hot pressurized air PA to flow into the storage tank 160 and be stored in the storage tank 160. Once the storage tank 160 is full, the first check valve 210a can be closed to allow the hot pressurized air PA to be injected into the ITM unit 170. During times of low solar radiation, the first check valve 210a can be closed and the second check valve 210b can be opened to allow the hot pressurized air PA stored in the storage tank 160 to be injected into the ITM unit 170.

It is to be noted that the hot pressurized air PA can have a temperature in the range of about 700° C. to 800° C. at the time that the hot pressurized air PA is injected into the ITM unit 170. Further, the rate at which the hot pressurized air PA is injected into the ITM unit 170 can vary depending on various environmental factors, such as the amount of oil O remaining in the oil well OW, the viscosity of the oil O, the ambient temperature, and the time of day.

The ITM unit 170 can be any type of suitable unit having an ion transport membrane including metal oxides that can separate the oxygen 302 from the hot pressurized air PA. Heat from the solar tower 120 can be used to heat the ITM unit 170 to enhance oxygen permeation across the ITM unit 170. The hot pressurized air PA can be injected into a feed side FS of the ITM unit 170, as illustrated in the sole drawing. As the hot pressurized air PA passes through the ITM unit 170, the oxygen 302 can be separated from the hot pressurized air PA. For example, as the pressurized air PA passes through the ITM unit 170, the oxygen 302 can pass through the ITM unit 170 to a permeate side PS and mix with the carbon dioxide 300, while nitrogen 304 remains on the feed side FS of the ITM unit 170 due to the permeability and selectivity of the ITM unit 170. Oxygen permeates through the membrane, leaving the remaining gases from the air, predominantly nitrogen, on the other side of the membrane. This nitrogen-enhanced gas can be compressed in the third compressor 190 and discharged through nitrogen discharge portion 192b into the well for further immiscible enhanced oil recovery. It is to be noted that the permeability and selectivity of the ITM unit 170 can vary, depending to the types of gases that are to be inserted into the oil well OW.

After passing through the ITM unit 170, the carbon dioxide 300 and the oxygen 302 can be injected into the oil well OW by any suitable means, such as through the first pipe P1, where it can combine with methane gas produced by the oil O in the oil well OW. The oxygen 302 can then be burned with the methane gas to generate sufficient heat necessary to enhance oil recovery, such as by decreasing the viscosity of the oil O remaining in the oil well OW so that the oil O can be extracted from the oil well OW, such as through the second pipe P2. Carbon dioxide generated by combustion of the methane with oxygen can be compressed in the second compressor unit 180 and discharged into the well through the carbon dioxide discharge portion 182b for further immiscible enhanced oil recovery.

The second compressor unit 180 can be any suitable compressor unit known in the art that can compress the carbon dioxide 300. The second compressor unit 180 can be positioned in communicating relation with the second pipe P2 to receive the carbon dioxide 300 produced from the combustion of the oxygen 302 and methane gas. For example, carbon dioxide 300 can be drawn into the carbon dioxide intake portion 182a of the second compressor unit 180 from the oil well OW through the second pipe P2. Once inside the second compressor unit 180, the carbon dioxide 300 can be compressed and subsequently exhausted through the carbon dioxide discharge portion 182b of the second compressor unit 180 into the permeate side PS of the ITM unit 170, where the carbon dioxide can enhance the oxygen 302 separation.

Further, the third compressor unit 190 can be any suitable compressor unit known in the art that can compress the nitrogen 304 remaining on the feed side FS of the ITM unit 170 and inject the nitrogen 304 into the oil well OW, such as through the third pipe P3. For example, the nitrogen 304 can be drawn into the third compressor unit 190 through the nitrogen intake portion 192a and injected into the third pipe P3 via the nitrogen discharge portion 192b of the third compressor unit 190. Injecting nitrogen 304 into the oil well OW through the third pipe P3, such as by any suitable means, can result in immiscible enhanced oil recovery.

By way of operation, the power source 105 can be activated at startup to provide power to the gas turbine 140 in order to rotate the shaft 116, which, in turn, provides power to the first compressor unit 110. Subsequently, the atmospheric air A can be drawn into the first compression unit 100 through the first intake portion 115a and converted into pressurized air PA. During normal operation, the pressurized air PA is supplied to the solar tower, such as through the pressurized air PA discharge portion 115b of the first compression unit 110. While in the solar tower 120, the pressurized air PA can be heated up to approximately 1200° C. using the heat generated from the sun S by the at least one solar collector 130. The gas turbine 140 can also be used to power the generator 200 to generate electricity for the at least one auxiliary accessory utilized in the extraction of oil, such as electricity to power the light L.

After the pressurized air PA is heated, it can be drawn into the gas turbine 140 through the turbine intake portion 142a and subsequently expelled from the turbine discharge portion 142b. It is to be noted that upon being discharged from the gas turbine 140 the hot pressurized air PA can have a temperature in the range of about 700° C. to 800° C. before it enters the ITM unit 170.

The pressurized air PA can then be injected into the splitter 150. Once in the splitter 150, the first check valve 210a can be opened such that the hot pressurized air PA can be stored in the storage tank 160 for use at time of low solar radiation, such as at night time or during cloudy days. It is to be noted that during the time that hot pressurized air PA is being sent to the storage tank 160, the second check valve 210b should remain closed. After the storage tank 160 is full, the first check valve 210a can be closed so that the hot pressurized air PA can be injected into the ITM unit 170, such as through the feed side FS of the ITM unit 170. It is to be noted that at times of low solar radiation, such as at night time or during cloudy days, the first check valve 210a can be closed and the second check valve 210b can be opened so that hot pressurized air PA can be injected into the ITM unit 170, such as through the feed side FS of the ITM unit 170.

Once the pressurized air PA is in the ITM unit 170, the oxygen 302 can be generated, such as by separating the oxygen 302 from the hot pressurized air PA. Due to the selectivity and permeability of the ITM unit 170, nitrogen 304 can remain on the feed side FS of the ITM unit 170, while the oxygen 302 can pass through to the permeate side PS of the ITM unit 170 and mix with the carbon dioxide 300 in the permeate side PS of the ITM unit 170. The carbon dioxide 300 can then be recycled to enhance the oxygen 302 separation in the ITM unit 170, while the oxygen 302 can be injected into the oil well OW through the first pipe P1 so that the oxygen 302 can be burned with the methane gas in the oil well OW to generate sufficient heat to enhance oil recovery, such as by decreasing the viscosity of the oil O.

The burning of the oxygen 302 and methane gas can generate additional carbon dioxide 300, such as the carbon dioxide 300 extracted through the second pipe P2, that can be used to purge the oxygen 302 and enhance the separation of the oxygen 302 from the hot pressurized air PA. Further, the nitrogen 304 that did not pass through the ITM unit 170 and remained on the feed side FS of the ITM unit 170 can be injected, such as by the third compressor unit 190, into the oil well OW, such as through the third pipe P3, for immiscible enhanced oil recovery.

It is to be understood that the present invention is not limited to the embodiments described above, but encompasses any and all embodiments within the scope of the following claims.

We claim:

1. An enhanced oil recovery system, comprising:
    a first compressor unit generating a flow of compressed atmospheric air;
    a solar tower having at least one solar collector, the solar tower receiving the flow of compressed atmospheric air from the first compressor unit and heating the compressed air;
    a gas turbine receiving the heated compressed air from the solar tower;
    an ion transport membrane unit receiving the heated compressed air from the gas turbine, the ion transport membrane unit having an ion transport membrane permeable to oxygen for separating oxygen from the heated compressed air, leaving a nitrogen-rich portion of the air;
    means for injecting the separated oxygen into an aged oil well for combustion with a portion of the oil in the well, heat from the combustion resulting in thermally enhanced oil recovery, the combustion producing carbon dioxide;
    a splitter disposed between said gas turbine and said ion transport membrane unit; and
    a storage tank connected to the splitter, the splitter splitting the heated compressed air from the gas turbine into a portion stored in the storage tank for night operations and a portion sent to said ion transport membrane unit for production of oxygen.

2. The enhanced oil recovery system according to claim 1, further comprising a first check valve disposed between said splitter and said storage tank.

3. The enhanced oil recovery system according to claim 1, further comprising a second compressor unit disposed between said ion transport membrane unit and the oil well for recycling carbon dioxide produced from the combustion of oxygen and methane gas in the oil well.

4. The enhanced oil recovery system according to claim 1, further comprising a generator connected to the turbine, the generator being configured for generating electricity.

5. The enhanced oil recovery system according to claim 1, further comprising means for injecting the nitrogen-rich portion of the air into an aged oil well for enhanced immiscible oil recovery.

6. The enhanced oil recovery system according to claim 1, further comprising means for injecting the combustion-produced carbon dioxide into an aged oil well for enhanced immiscible oil recovery.

7. The enhanced oil recovery system according to claim 1, further comprising:
    means for injecting the nitrogen-rich portion of the air into an aged oil well for enhanced immiscible oil recovery; and
    means for injecting the combustion-produced carbon dioxide into an aged oil well for enhanced immiscible oil recovery.

8. A method for enhancing oil recovery from an aged oil well, comprising the steps of:
    compressing atmospheric air;
    heating the compressed atmospheric air in a solar tower using solar energy;
    drawing the heated compressed air from the solar tower into a gas turbine to power the turbine;
    supplying a portion of the heated compressed air from the turbine to an ion transport membrane unit;
    storing a remainder of the heated compressed air from the turbine in a storage tank;
    separating oxygen from the heated compressed air in the ion transport membrane unit using an ion transport membrane;
    injecting the separated oxygen into the aged oil well;
    combusting the injected oxygen with fuel in the well, the oxygen-based combustion generating heat for thermally enhanced oil recovery; and
    transferring the remainder of the heated compressed air from the storage tank to the ion transport membrane unit at night time.

9. The method for enhancing oil recovery according to claim 8, wherein said step of heating the compressed atmospheric air in the solar tower comprises heating the air to a temperature of about 1200° C.

10. The method for enhancing oil recovery according to claim 8, wherein said step of supplying at least a portion of the heated compressed air to the ion transport membrane unit comprises supplying the air at a temperature between 700° C. and 800° C.

11. The method for enhancing oil recovery according to claim 8, further comprising the step of powering an electrical generator from the gas turbine.

12. The method for enhancing oil recovery according to claim 8, further comprising the step of injecting nitrogen remaining after separation of oxygen from the air into the oil well for immiscible enhanced oil recovery.

13. The method for enhancing oil recovery according to claim 8, further comprising the step of recycling carbon dioxide produced by the combustion of oxygen in the oil well to the ion transport membrane unit.

14. The method for enhancing oil recovery according to claim 8, further comprising the steps of:
    compressing a nitrogen-enriched portion of the air left by said step of separating oxygen from the heated compressed air in the ion transport membrane unit; and
    injecting the compressed nitrogen-enriched portion of the air into the oil well for enhanced immiscible oil recovery.

15. The method for enhancing oil recovery according to claim 8, further comprising the steps of:

compressing carbon dioxide produced by said step of combusting the injected oxygen with fuel in the well; and injecting the compressed carbon dioxide into the oil well for enhanced immiscible oil recovery.

\* \* \* \* \*